US012636850B2

(12) United States Patent
Ribbink et al.

(10) Patent No.: US 12,636,850 B2
(45) Date of Patent: May 26, 2026

(54) METHOD AND APPARATUS FOR INFLATING AND SEALING A PREFABRICATED INFLATABLE TRACK

(71) Applicants: RIPAC GmbH, Grevenbroich (DE); GFC Engineering Sp. z o.o., Jelcz-Laskowice (PL)

(72) Inventors: Hendrik Ribbink, Roermond (NL); Piotr Żółtogórski, Krzeptów (PL)

(73) Assignees: RIPAC GmbH, Grevenbroich (DE); GFC Engineering Sp. z o.o., Jelcz-Laskowice (PL)

(*) Notice: Subject to any disclaimer, the term of this patent is extended or adjusted under 35 U.S.C. 154(b) by 410 days.

(21) Appl. No.: 18/479,054

(22) Filed: Sep. 30, 2023

(65) Prior Publication Data

US 2025/0050611 A1 Feb. 13, 2025

(51) Int. Cl.
*B31D 5/00* (2017.01)

(52) U.S. Cl.
CPC .... *B31D 5/0073* (2013.01); *B31D 2205/0023* (2013.01); *B31D 2205/0047* (2013.01); *B31D 2205/0058* (2013.01); *B31D 2205/0082* (2013.01)

(58) Field of Classification Search
USPC .......................................................... 700/213
See application file for complete search history.

(56) References Cited

U.S. PATENT DOCUMENTS

| | | | | |
|---|---|---|---|---|
| 6,209,286 B1 * | 4/2001 | Perkins | B65D 81/052 53/553 |
| 7,067,025 B2 * | 6/2006 | Borgeat | B31D 5/0073 156/515 |
| 7,150,136 B2 * | 12/2006 | Perkins | B29C 65/222 53/403 |
| 7,326,162 B2 | 2/2008 | Sauder et al. | |
| 7,347,911 B2 | 3/2008 | Selle et al. | |
| 7,721,781 B2 * | 5/2010 | Sperry | B29C 65/222 156/497 |

(Continued)

FOREIGN PATENT DOCUMENTS

| | | |
|---|---|---|
| DE | 60312783 T2 | 1/2008 |
| EP | 1527001 B1 | 12/2011 |
| EP | 3888893 A1 | 10/2021 |

OTHER PUBLICATIONS

Extended European Search Report of the European Patent Office in related European Patent Appl. No. 23204837.1, dated Apr. 17, 2024, 14 pages.

*Primary Examiner* — Jonathan L Sample

(74) *Attorney, Agent, or Firm* — Bochner PLLC; Andrew D. Bochner

(57) ABSTRACT

Provided is a method and a device for inflating and sealing an inflatable film, in which the quality of the seals of the air containers is to be improved compared to the prior art, it is proposed that use be made of the following features: a conveyor system for conveying the inflatable film, having a first pair of rollers and a second pair of rollers, between which the web can be arranged and which are on the conveyor section are arranged one behind the other; an inflation system to direct air/gas into the openings in the containers; a sealing device for sealing the openings of the inflated containers, and; a control unit to promote the film with constant traction and tension.

20 Claims, 6 Drawing Sheets

(56) References Cited

U.S. PATENT DOCUMENTS

| | | | | |
|---|---|---|---|---|
| 7,950,433 | B2 * | 5/2011 | Sperry | B31D 5/0073 53/569 |
| 7,959,103 | B2 | 6/2011 | Cocciadiferro et al. | |
| 8,323,774 | B2 | 12/2012 | Perkins et al. | |
| 9,540,162 | B2 * | 1/2017 | Sperry | B65B 31/02 |
| 10,766,220 | B2 * | 9/2020 | Deis | B31D 5/0052 |
| 2002/0108697 | A1 * | 8/2002 | Perkins | B29C 66/133 156/308.4 |
| 2007/0181258 | A1 * | 8/2007 | Robinson | B65H 18/028 156/352 |
| 2009/0321020 | A1 * | 12/2009 | Kim | B31D 5/0073 156/498 |
| 2015/0239195 | A1 * | 8/2015 | Wetsch | G05B 15/02 53/403 |
| 2015/0239231 | A1 | 8/2015 | Regelsberger et al. | |
| 2019/0170298 | A1 * | 6/2019 | Zhang | F17C 5/00 |
| 2022/0177173 | A1 | 6/2022 | Ferrarini et al. | |
| 2022/0352491 | A1 | 11/2022 | Li et al. | |
| 2023/0120336 | A1 * | 4/2023 | Colomer | B65B 9/2021 53/374.4 |
| 2024/0199261 | A1 * | 6/2024 | Wetsch | B65B 41/14 |

* cited by examiner

METHOD AND APPARATUS FOR INFLATING AND SEALING A PREFABRICATED INFLATABLE TRACK

FIELD OF THE INVENTION

The present invention relates to methods and apparatuses for packing material manufacture, and, specifically, a method and apparatus for inflating and sealing an inflatable web having a series of inflatable containers formed between the films by seals, each inflatable container capable of containing a quantity of gas.

INTRODUCTION

Bubble wrap, also known as bubble pack or bubble packing, is a flexible packaging material used primarily to protect products during transit. Bubble wrap is typically made of plastic sheeting that has small cushions filled with gas, such as air. Such packaging material is used in various industries, such as e-commerce, the electronics industry, mail order, the food industry, and the furniture industry.

The air cushions serve to cushion shocks and vibrations during transport and, thus, prevent damage to the packaged products. They provide effective padding and protect against scratches, bumps, vibrations, and moisture. They're also reusable and recyclable, making them an eco-friendly option.

Overall, bubble wrap provides an effective and cost-effective solution for protecting products during transit. Bubble wrap is easy to use, offers a high level of protection and is environmentally friendly as such bubble wrap is typically made up of approximately 99% air and only approximately 1% of a recyclable film material.

Air cushion films are made from a variety of film materials that are specifically designed for their cushioning properties. The choice of film material depends on several factors, including the type of products to be packaged, the cushioning properties desired, and the environmental impact. Choosing the right film material is important to ensure an effective and sustainable packaging solution.

In addition to their good mechanical properties, these materials are also characterized by good recyclability and can be made from up to 100% post-consumer recyclate.

Air cushion films can be produced as mono films or from multiple layers of different materials as coextrusion films or laminates in order to achieve specific properties such as improved barrier properties, tear resistance, and puncture resistance. For example, films can be made with a combination of PE and polyamide or EVOH.

With the growing awareness of environmental issues, biodegradable films for bubble wrap are also being developed. These films consist of materials such as PLA (polylactide) or starch and naturally decompose under certain conditions.

The thickness of the films can vary depending on the application and is usually between 10 and 100 μm.

Air cushion machines are usually used to produce air cushion and air cushion films. These machines or devices enable decentralized production on site at the user of these air cushion films.

It is therefore important that equipment for manufacturing such inflatable materials is compact in size and easy to operate. In addition, it is important that the inflated cushions (containers) can be manufactured quickly, sufficiently inflated, and securely sealed.

The process of air cushion making with an air cushion machine is usually as follows:

The machine is loaded with a roll of yet-to-be-inflated bubble wrap.

The film is fed through the machine using conveyor belts and/or rollers.

The machine projects air into the film to inflate the air cushion or air cushions. These are then sealed by applying heat. The finished air cushion or air cushions are then separated and can be used to package products. Depending on the manufacturing process, these steps may also vary somewhat.

Air cushion machines with conveyor belts use a conveyor belt instead of rollers to guide the air cushion film through the production process. The conveyor belt can be made of rubber or another suitable material and is moved by a drive unit.

Air cushion machines with transport rollers have special rollers on which the air cushion film is placed. The rolls are positioned in such a way that the film can be fed smoothly through the machine. The rollers can be powered to continuously move the film through the production process.

In order to properly inflate pre-configured chambers in air cushion films, the film must be supplied with an optimal amount of air at a specific pressure. It is also important that the chambers remain properly inflated until the air inlet of the chambers is sealed.

The sealing is usually done by appropriately equipped rollers or by a sealing device downstream of the rollers. Since the quality of the seal depends on the film being kept under tension after sealing, until it cools down, two pull rollers are sometimes provided, which transport the inflated and sealed film further.

It has been found that a system in which the take-off rollers rotate at the same speed as the rollers in or before the sealing area very often leads to a situation where the initial tension of the film between the two sets of rollers changes due to uncontrolled material slippage changes under the aforementioned drive and take-off rollers.

The advantages of adjusting a film tension for the quality of the air cushion material is described in U.S. Pat. No. 7,950,433 B2. Here the tension of the film between the roll of the starting film material and the sealing area is controlled. A tension control device consisting of a rigid and a movable contact element performs this function by increasing the frictional resistance it exerts on the web when the tension in the web between the film roll and the sealing area decreases (due to the depletion of web stock on the roll).

U.S. Pat. No. 7,150,136 B2 describes that the rollers after the sealing area rotate at a constant, slightly higher linear speed than the rollers in the sealing area (e.g., in a ratio of 8:7) in order to tension the film material and allegedly better control the passage through the sealing arrangement. However, this can lead to uncontrolled tension in the film immediately after the heat-sealing, since rotation at different speeds leads to tension in the film, but this cannot be controlled in the desired manner. The air cushion films produced in this way therefore have an inconsistent sealing seam quality which is unsatisfactory overall.

It is therefore the object of the present disclosure to provide a method and a corresponding device which eliminates the disadvantages of the prior art with regard to the quality of the seals.

SUMMARY

The following items are exemplary and explanatory only and are not intended to limit the claimed disclosure or application thereof in any manner whatsoever.

(Item 1). A method for inflating and sealing an inflatable sheet, comprising the steps of:

a. conveying an inflatable sheet along a conveyor route by means of a first pair of rollers and by means of a second pair of rollers, which are arranged one behind the other on the conveyor route, wherein a first electric motor drives at least one roller of the first pair of rollers and a second electric motor drives at least one roller of the second pair of rollers, the inflatable sheet comprising opposing longitudinal edges and a pair of films sealed together by transverse seals forming a sequence of containers between pairs of transverse seals, each of the containers being fillable with a quantity of gas and having an opening for receiving the gas;

b. inflating the containers by introducing the gas while the inflatable sheet is moved along the conveying path;

c. sealing the openings of the containers after inflation, and d. controlling the second electric motor in step a) such that at least one roller of the second pair of rollers exert tension on the inflatable sheet with a constant torque.

(Item 2). The method according to item 1, wherein the first pair of rollers are mutually contacting and the second pair of rollers are mutually contacting.

(Item 3). The method according to item 1, further comprising the step of: adjusting a speed of the first electric motor to adjust the speed of transport of the inflatable sheet.

(Item 4). A device for inflating and sealing an inflatable sheet, the device comprising:

a. a conveyor system for conveying the inflatable sheet along a conveyor route, the conveyor system comprising:

a first pair of mutually contacting rollers and a second pair of mutually contacting rollers, between which the inflatable sheet can be arranged and which are arranged one behind the other on the conveyor line, wherein a first electric motor is provided to drive at least one roller of the first pair of mutually contacting rollers and a second electric motor is provided to drive at least one roller of the second pair of mutually contacting rollers;

b. an inflation system configured to direct gas into openings of containers of the inflatable sheet while the inflatable sheet is moved along the conveyor path to thereby inflate the containers;

c. a sealing device for sealing the openings of the containers after the containers are inflated by the inflation system; and d. a control unit which is configured to control the second electric motor to induce a constant torque in at least one of the second pair of mutually contacting rollers.

(Item 5). The device according to item 4, wherein the control unit is configured to adjust a speed of the first electric motor.

(Item 6). The device according to item 4, wherein the control unit is configured to exert a tensile force acting on the inflatable sheet between the first pair of mutually contacting rollers and the second pair of mutually contacting rollers to maintain a constant force, wherein the constant force is in a range from 0.1 to 7.5 N.

(Item 7). The device according to item 6, wherein the constant force is in a range from 0.5 to 3N.

(Item 8). The device according to item 4, wherein in order to provide a constant torque through the at least one roller of the second pair of mutually contacting rollers, the second electric motor is supplied with a constant amount of power.

(Item 9). The device according to item 4, wherein the sealing device is formed by the first pair of mutually contacting rollers, one of the rollers being provided with a heating element.

(Item 10). The device according to item 4, wherein the sealing device is disposed between the first pair of mutually contacting rollers and the second pair of mutually contacting rollers and a heating element configured for immediate heating.

(Item 11). The device according to item 9, wherein the control unit is configured to monitor and adjust the temperature of the heating element of the sealing device.

(Item 12). The device according to item 4, wherein the inflation system is configured to inflate the inflatable sheet along a longitudinal edge of the inflatable sheet to which the opening of the containers faces, and comprising at least one gas outlet opening located adjacent the longitudinal edge of the inflatable sheet to inflate the containers.

(Item 13). The device according to item 4, wherein the inflation system comprises an elongated inflation nozzle running parallel to the conveying section, configured for extending along the longitudinal edge, the inflation channel extending along the inflatable sheet and into which the openings of the containers open.

(Item 14). The device according to item 13, wherein the elongated inflation nozzle extends at least partially between the first pair of mutually contacting rollers and the second pair of mutually contacting rollers.

(Item 15). The device according to item 4, wherein between the first pair of mutually contacting rollers and the second pair of mutually contacting rollers a cutting means is provided which is configured to open the inflatable sheet during transport on the conveyor line.

(Item 16). The device according to item 15, wherein the cutting means for opening the inflatable sheet is a blade.

(Item 17). The device according to item 7, wherein the second pair of mutually contacting rollers is arranged in such a way that they are located at the edge of the conveyor section and that the first pair of mutually contacting rollers are arranged on the conveyor section further from the edge of the conveyor section, such that the surfaces of the conveyor section covered by the first pair of mutually contacting rollers and the second pair of mutually contacting rollers do not overlap.

(Item 18). The device according to item 4, wherein the device comprises a torque limiter configured to set the torque to a maximum value in the event of a fault or to interrupt the torque flow.

(Item 19). The device according to item 4, wherein the control unit comprises a data memory in which parameters for setting the tensile force for selected materials of the web are stored, the parameters being selected from torque, speed, material, film thickness, and temperature.

(Item 20). A device for inflating an inflatable sheet, the device comprising:

an inflation nozzle comprising a gas outlet configured to project gas, the inflation nozzle configured to temporarily capture an inflation channel of the inflatable sheet, wherein the inflation nozzle is an elongated cylindrical member;

a first pair of rollers, at least one of the first pair of rollers in mechanical communication with a first electric motor, at least one of the first pair of rollers comprising a heating element, wherein the heating element is configured to seal the inflation channel of the inflatable sheet after inflation of the inflatable sheet, wherein the at least one of the first pair of rollers comprising the heating element is composed of a heat resistant material;

a second pair of rollers, at least one of the second pair of rollers in mechanical communication with a second electric motor;

a cutting device disposed between the first pair of rollers and the second pair of rollers, the cutting device configured to slice the inflatable sheet such that the inflatable sheet is free from the inflation nozzle; and a control unit configured to actuate at least one of the first pair of rollers and at least one of the second pair of rollers, via the first electric motor and the second electric motor, respectively, wherein the control unit is configured to maintain a constant torque in the at least one of the second pair of rollers, wherein the constant toque is configured to maintain a desired tension in the inflatable sheet between the first pair of rollers and the second pair of rollers.

Additional aspects related to this disclosure are set forth, in part, in the description which follows, and, in part, will be obvious from the description, or may be learned by practice of this disclosure.

It is to be understood that both the foregoing and the following descriptions are exemplary and explanatory only and are not intended to limit the claimed disclosure or application thereof in any manner whatsoever.

BRIEF DESCRIPTION OF THE DRAWINGS

The incorporated drawings, which are incorporated in and constitute a part of this specification exemplify the aspects of the present disclosure and, together with the description, explain and illustrate principles of this disclosure.

PARTS LIST

1 Inflation Opening
2 Inflation Nozzle
3 Upper Roller/Sealing Roller
4 Lower Roller/Sealing Drive Roller
5 Heating element
6 Position Of A Cutting Device
7 Mounting Of The Inflation System
8 Upper Pull Roller
9 Lower Pull Roller/Pull Drive Roller
10 Sealing Area
11 Controlled Film Tension Area
12 Film Web
13 Conveying Path/Conveying Direction
14, 15 Longitudinal Edges
16, 17 Films
18 Seal
19 Container
20 Opening
21 Inflation Channel
22 Perforation Line
23 Chassis
24 Mounting Panel
25 Upper Shielding
26 Lower Shielding
27 First Foot
28 Second Foot
29 Control Interface
30 Start Button
31 Stop Button
32 Display
33 Blower Speed Selection
34 Temperature Selection
35 Speed Selection
36 Program Selection
37 Carrier Structure
38 Guide Element

DETAILED DESCRIPTION

In the following detailed description, reference will be made to the accompanying drawing(s), in which identical functional elements are designated with like numerals. The aforementioned accompanying drawings show by way of illustration, and not by way of limitation, specific aspects, and implementations consistent with principles of this disclosure. These implementations are described in sufficient detail to enable those skilled in the art to practice the disclosure and it is to be understood that other implementations may be utilized and that structural changes and/or substitutions of various elements may be made without departing from the scope and spirit of this disclosure. The following detailed description is, therefore, not to be construed in a limited sense.

It is noted that description herein is not intended as an extensive overview, and as such, concepts may be simplified in the interests of clarity and brevity. As used herein, a "set" may refer generally to one or more of the item to which it relates. Thus, items appended with the language of "set" or "one or more" may be interpreted as one or more of the item.

All documents mentioned in this application are hereby incorporated by reference in their entirety. Any process described in this application may be performed in any order and may omit any of the steps in the process. Processes may also be combined with other processes or steps of other processes.

Figure 1:
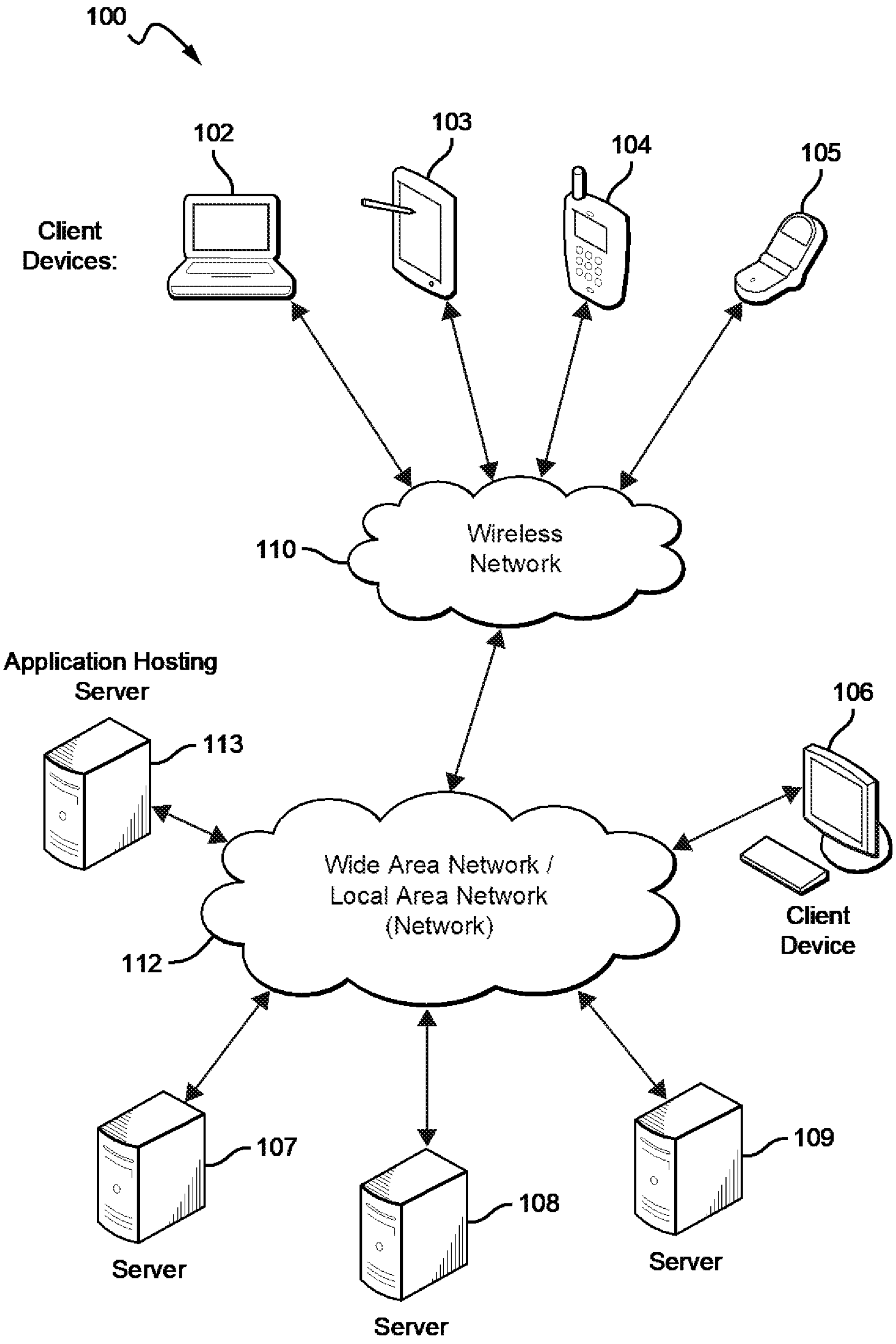
FIG. 1 is a functional diagram illustrating a programmed computer system that can implement one or more aspects of an embodiment of the invention.

FIG. 1 illustrates components of one embodiment of an environment in which the invention may be practiced. Not all of the components may be required to practice the invention, and variations in the arrangement and type of the components may be made without departing from the spirit or scope of the invention. As shown, the system 100 includes one or more Local Area Networks ("LANs")/Wide Area Networks ("WANs") 112, one or more wireless networks 110, one or more wired or wireless client devices 106, mobile or other wireless client devices 102-105, servers 107-109, and may include or communicate with one or more data stores or databases. Various of the client devices

102-106 may include, for example, desktop computers, laptop computers, set top boxes, tablets, cell phones, smart phones, smart speakers, wearable devices (such as the Apple Watch) and the like. Servers 107-109 can include, for example, one or more application servers, content servers, search servers, and the like. FIG. 1 also illustrates application hosting server 113.

Figure 2:
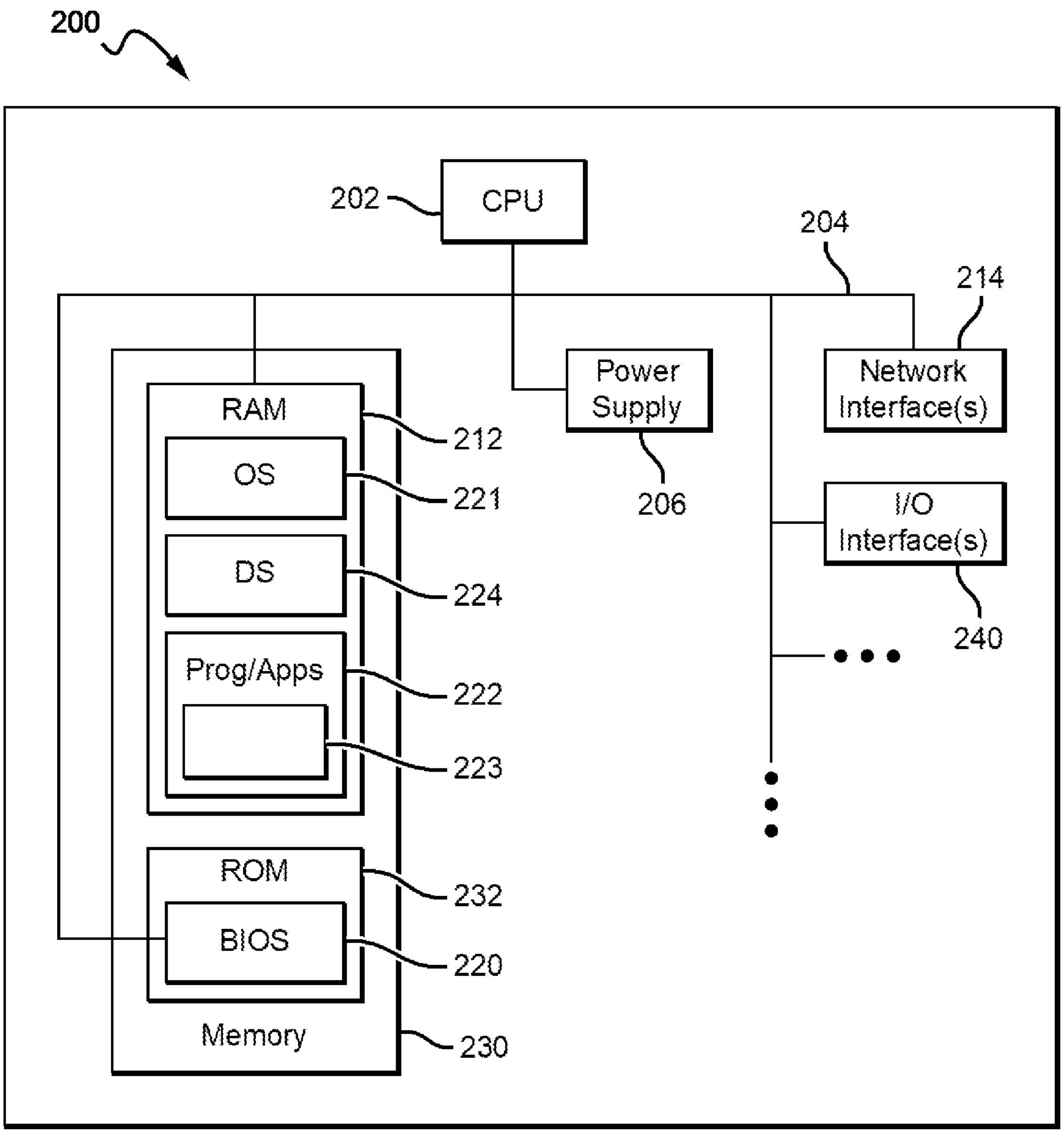
FIG. 2 illustrates a block diagram of a distributed computer system that can implement one or more aspects of an embodiment of the present invention.

FIG. 2 illustrates a block diagram of an electronic device 200 that can implement one or more aspects of an apparatus, system and method for validating and correcting user information (the "Engine") according to one embodiment of the invention. Instances of the electronic device 200 may include servers, e.g., servers 107-109, and client devices, e.g., client devices 102-106. In general, the electronic device 200 can include a processor/CPU 202, memory 230, a power supply 206, and input/output (I/O) components/devices 240, e.g., microphones, speakers, displays, touchscreens, keyboards, mice, keypads, microscopes, GPS components, cameras, heart rate sensors, light sensors, accelerometers, targeted biometric sensors, etc., which may be operable, for example, to provide graphical user interfaces or text user interfaces.

A user may provide input via a touchscreen of an electronic device 200. A touchscreen may determine whether a user is providing input by, for example, determining whether the user is touching the touchscreen with a part of the user's body such as his or her fingers. The electronic device 200 can also include a communications bus 204 that connects the aforementioned elements of the electronic device 200. Network interfaces 214 can include a receiver and a transmitter (or transceiver), and one or more antennas for wireless communications.

The processor 202 can include one or more of any type of processing device, e.g., a Central Processing Unit (CPU), and a Graphics Processing Unit (GPU). Also, for example, the processor can be central processing logic, or other logic, may include hardware, firmware, software, or combinations thereof, to perform one or more functions or actions, or to cause one or more functions or actions from one or more other components. Also, based on a desired application or need, central processing logic, or other logic, may include, for example, a software-controlled microprocessor, discrete logic, e.g., an Application Specific Integrated Circuit (ASIC), a programmable/programmed logic device, memory device containing instructions, etc., or combinatorial logic embodied in hardware. Furthermore, logic may also be fully embodied as software.

The memory 230, which can include Random Access Memory (RAM) 212 and Read Only Memory (ROM) 232, can be enabled by one or more of any type of memory device, e.g., a primary (directly accessible by the CPU) or secondary (indirectly accessible by the CPU) storage device (e.g., flash memory, magnetic disk, optical disk, and the like). The RAM can include an operating system 221, data storage 224, which may include one or more databases, and programs and/or applications 222, which can include, for example, software aspects of the program 223. The ROM 232 can also include Basic Input/Output System (BIOS) 220 of the electronic device.

Software aspects of the program 223 are intended to broadly include or represent all programming, applications, algorithms, models, software and other tools necessary to implement or facilitate methods and systems according to embodiments of the invention. The elements may exist on a single computer or be distributed among multiple computers, servers, devices or entities.

The power supply 206 contains one or more power components, and facilitates supply and management of power to the electronic device 200.

The input/output components, including Input/Output (I/O) interfaces 240, can include, for example, any interfaces for facilitating communication between any components of the electronic device 200, components of external devices (e.g., components of other devices of the network or system 100), and end users. For example, such components can include a network card that may be an integration of a receiver, a transmitter, a transceiver, and one or more input/output interfaces. A network card, for example, can facilitate wired or wireless communication with other devices of a network. In cases of wireless communication, an antenna can facilitate such communication. Also, some of the input/output interfaces 240 and the bus 204 can facilitate communication between components of the electronic device 200, and in an example can ease processing performed by the processor 202.

Where the electronic device 200 is a server, it can include a computing device that can be capable of sending or receiving signals, e.g., via a wired or wireless network, or may be capable of processing or storing signals, e.g., in memory as physical memory states. The server may be an application server that includes a configuration to provide one or more applications, e.g., aspects of the Engine, via a network to another device. Also, an application server may, for example, host a web site that can provide a user interface for administration of example aspects of the Engine.

Any computing device capable of sending, receiving, and processing data over a wired and/or a wireless network may act as a server, such as in facilitating aspects of implementations of the Engine. Thus, devices acting as a server may include devices such as dedicated rack-mounted servers, desktop computers, laptop computers, set top boxes, integrated devices combining one or more of the preceding devices, and the like.

Servers may vary widely in configuration and capabilities, but they generally include one or more central processing units, memory, mass data storage, a power supply, wired or wireless network interfaces, input/output interfaces, and an operating system such as Windows Server, Mac OS X, Unix, Linux, FreeBSD, and the like.

A server may include, for example, a device that is configured, or includes a configuration, to provide data or content via one or more networks to another device, such as in facilitating aspects of an example apparatus, system and method of the Engine. One or more servers may, for example, be used in hosting a Web site, such as the web site www.microsoft.com. One or more servers may host a variety of sites, such as, for example, business sites, informational sites, social networking sites, educational sites, wikis, financial sites, government sites, personal sites, and the like.

Servers may also, for example, provide a variety of services, such as Web services, third-party services, audio services, video services, email services, HTTP or HTTPS services, Instant Messaging (IM) services, Short Message Service (SMS) services, Multimedia Messaging Service (MMS) services, File Transfer Protocol (FTP) services, Voice Over IP (VOIP) services, calendaring services, phone services, and the like, all of which may work in conjunction with example aspects of an example systems and methods for the apparatus, system and method embodying the Engine. Content may include, for example, text, images, audio, video, and the like.

In example aspects of the apparatus, system and method embodying the Engine, client devices may include, for example, any computing device capable of sending and receiving data over a wired and/or a wireless network. Such client devices may include desktop computers as well as portable devices such as cellular telephones, smart phones, display pagers, Radio Frequency (RF) devices, Infrared (IR) devices, Personal Digital Assistants (PDAs), handheld computers, GPS-enabled devices tablet computers, sensor-equipped devices, laptop computers, set top boxes, wearable computers such as the Apple Watch and Fitbit, integrated devices combining one or more of the preceding devices, and the like.

Client devices such as client devices 102-106, as may be used in an example apparatus, system and method embodying the Engine, may range widely in terms of capabilities and features. For example, a cell phone, smart phone or tablet may have a numeric keypad and a few lines of monochrome Liquid-Crystal Display (LCD) display on which only text may be displayed. In another example, a Web-enabled client device may have a physical or virtual keyboard, data storage (such as flash memory or SD cards), accelerometers, gyroscopes, respiration sensors, body movement sensors, proximity sensors, motion sensors, ambient light sensors, moisture sensors, temperature sensors, compass, barometer, fingerprint sensor, face identification sensor using the camera, pulse sensors, heart rate variability (HRV) sensors, beats per minute (BPM) heart rate sensors, microphones (sound sensors), speakers, GPS or other location-aware capability, and a 2D or 3D touch-sensitive color screen on which both text and graphics may be displayed. In some embodiments multiple client devices may be used to collect a combination of data. For example, a smart phone may be used to collect movement data via an accelerometer and/or gyroscope and a smart watch (such as the Apple Watch) may be used to collect heart rate data. The multiple client devices (such as a smart phone and a smart watch) may be communicatively coupled.

Client devices, such as client devices 102-106, for example, as may be used in an example apparatus, system and method implementing the Engine, may run a variety of operating systems, including personal computer operating systems such as Windows, iOS or Linux, and mobile operating systems such as iOS, Android, Windows Mobile, and the like. Client devices may be used to run one or more applications that are configured to send or receive data from another computing device. Client applications may provide and receive textual content, multimedia information, and the like. Client applications may perform actions such as browsing webpages, using a web search engine, interacting with various apps stored on a smart phone, sending and receiving messages via email, SMS, or MMS, playing games, interacting with mobile health applications or digital treatment regimens, receiving advertising, watching locally stored or streamed video, or participating in social networks.

In example aspects of the apparatus, system and method implementing the Engine, one or more networks, such as networks 110 or 112, for example, may couple servers and client devices with other computing devices, including through wireless network to client devices. A network may be enabled to employ any form of computer readable media for communicating information from one electronic device to another. The computer readable media may be non-transitory. Thus, in various embodiments, a non-transitory computer readable medium may comprise instructions stored thereon that, when executed by a processing device, cause the processing device to carry out an operation (e.g., feeding inflatable sheets, and inflating, cutting, and heating said sheets). In such an embodiment, the operation may be carried out on a singular device or between multiple devices (e.g., a server and a client device). A network may include the Internet in addition to Local Area Networks (LANs), Wide Area Networks (WANs), direct connections, such as through a Universal Serial Bus (USB) port, other forms of computer-readable media (computer-readable memories), or any combination thereof. On an interconnected set of LANs, including those based on differing architectures and protocols, a router acts as a link between LANs, enabling data to be sent from one to another.

Communication links within LANs may include twisted wire pair or coaxial cable, while communication links between networks may utilize analog telephone lines, cable lines, optical lines, full or fractional dedicated digital lines including T1, T2, T3, and T4, Integrated Services Digital Networks (ISDNs), Digital Subscriber Lines (DSLs), wireless links including satellite links, optic fiber links, or other communications links known to those skilled in the art. Furthermore, remote computers and other related electronic devices could be remotely connected to either LANs or WANs via a modem and a telephone link.

A wireless network, such as wireless network 110, as in an example apparatus, system and method implementing the Engine, may couple devices with a network. A wireless network may employ stand-alone ad-hoc networks, mesh networks, Wireless LAN (WLAN) networks, cellular networks, and the like.

A wireless network may further include an autonomous system of terminals, gateways, routers, or the like connected by wireless radio links, or the like. These connectors may be configured to move freely and randomly and organize themselves arbitrarily, such that the topology of wireless network may change rapidly. A wireless network may further employ a plurality of access technologies including 2nd (2G), 3rd (3G), 4th (4G), $5^{th}$ (5G) generation, Long Term Evolution (LTE) radio access for cellular systems, WLAN, Wireless Router (WR) mesh, and the like. Access technologies such as 2G, 2.5G, 3G, 4G, 5G, and future access networks may enable wide area coverage for client devices, such as client devices with various degrees of mobility. For example, a wireless network may enable a radio connection through a radio network access technology such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, and the like. A wireless network may include virtually any wireless communication mechanism by which information may travel between client devices and another computing device, network, and the like.

Internet Protocol (IP) may be used for transmitting data communication packets over a network of participating digital communication networks, and may include protocols such as TCP/IP, UDP, DECnet, NetBEUI, IPX, Appletalk, and the like. Versions of the Internet Protocol include IPv4 and IPV6. The Internet includes local area networks (LANs), Wide Area Networks (WANs), wireless networks, and long-haul public networks that may allow packets to be communicated between the local area networks. The packets may be transmitted between nodes in the network to sites each of which has a unique local network address. A data communication packet may be sent through the Internet from a user site via an access node connected to the Internet. The packet may be forwarded through the network nodes to any target site connected to the network provided that the site address of the target site is included in a header of the packet. Each packet communicated over the Internet may be routed via a path determined by gateways and servers that switch the packet according to the target address and the availability of a network path to connect to the target site.

The header of the packet may include, for example, the source port (16 bits), destination port (16 bits), sequence number (32 bits), acknowledgement number (32 bits), data offset (4 bits), reserved (6 bits), checksum (16 bits), urgent pointer (16 bits), options (variable number of bits in multiple of 8 bits in length), padding (may be composed of all zeros and includes a number of bits such that the header ends on a 32 bit boundary). The number of bits for each of the above may also be higher or lower.

A “content delivery network” or “content distribution network” (CDN), as may be used in an example apparatus, system and method implementing the Engine, generally refers to a distributed computer system that comprises a collection of autonomous computers linked by a network or networks, together with the software, systems, protocols and techniques designed to facilitate various services, such as the storage, caching, or transmission of content, streaming media and applications on behalf of content providers. Such services may make use of ancillary technologies including, but not limited to, “cloud computing,” distributed storage, DNS request handling, provisioning, data monitoring and reporting, content targeting, personalization, and business intelligence. A CDN may also enable an entity to operate and/or manage a third party’s web site infrastructure, in whole or in part, on the third party’s behalf.

A Peer-to-Peer (or P2P) computer network relies primarily on the computing power and bandwidth of the participants in the network rather than concentrating it in a given set of dedicated servers. P2P networks are typically used for connecting nodes via largely ad hoc connections. A pure peer-to-peer network does not have a notion of clients or servers, but only equal peer nodes that simultaneously function as both “clients” and “servers” to the other nodes on the network.

Embodiments of the present invention include apparatuses, systems, and methods implementing the Engine. Embodiments of the present invention may be implemented on one or more of client devices 102-106, which are communicatively coupled to servers including servers 107-109. Moreover, client devices 102-106 may be communicatively (wirelessly or wired) coupled to one another. In particular, software aspects of the Engine may be implemented in the program 223. The program 223 may be implemented on one or more client devices 102-106, one or more servers 107-109, and 113, or a combination of one or more client devices 102-106, and one or more servers 107-109 and 113.

In an embodiment, the system may receive, process, generate and/or store time series data. The system may include an application programming interface (API). The API may include an API subsystem. The API subsystem may allow a data source to access data. The API subsystem may allow a third-party data source to send the data. In one example, the third-party data source may send JavaScript Object Notation (“JSON”)-encoded object data. In an embodiment, the object data may be encoded as XML-encoded object data, query parameter encoded object data, or byte-encoded object data.

This object is achieved by a method and a device having the features of the independent claims. Advantageous developments of the invention are characterized in the dependent claims.

For the purposes of this disclosure, both gas and air are mentioned in reference to inflating the prefabricated film. As air is gaseous, a person of ordinary skill in the art should interpret that the term gas may be used, and it is understood that gas may include air. In various embodiments, if only air is named, the suitability of other gasses is also to be understood.

As contemplated in this disclosure, across various embodiments, setting an optimal tension not only improves problems when cutting the film, but in particular the quality of the sealed seam, in that the newly created, still hot sealed seam cannot contract and thus does not come into contact with other areas of the film. Such undesired contact with other areas of the film can lead to a defect in the sealing seam and thus manifest defective film cushion(s) and a reject of the film.

The method according to the disclosure and a corresponding device are described below, which are adapted to avoid this problem and thus lead to improved film quality with fewer rejects and therefore lower costs.

The advantageous configurations of the device also apply analogously to the method and vice versa. Thus, characteristics of the device may apply to aspects of the steps of the method and/or aspects of the steps of the method may apply to the characteristics or components of the device.

In an embodiment, the method of the present disclosure of inflating and sealing an inflatable web having opposed longitudinal edges and a pair of films sealed together by transverse seals forming a succession of inflatable containers between pairs of transverse seals, each of the containers having a quantity of gas that can be filled and has an opening for receiving this gas, comprises the following steps:

a. conveying the inflatable web along a conveyor line by means of a first pair of rollers that are in contact with one another and by means of a second pair of rollers that are in contact with one another and are arranged one behind the other on the conveyor line, with a first electric motor driving at least one roller of the first pair of rollers and with a second electric motor driving at least one roller of the second pair of rollers;
b. inflating the containers by introducing gas while the web is moving along the conveyor line;
c. sealing the openings of the containers after inflation; and
d. controlling the second electric motor in step a) such that the second pair of rollers pulls the web with a constant torque.

In an embodiment, the speed of transport of the web along the conveyor route is carried out by adjusting the speed of the first electric motor.

According to the present disclosure, in an embodiment, an apparatus is provided for inflating and sealing an inflatable web having opposing longitudinal edges and a pair of films sealed together by transverse seals forming a series of inflatable containers between pairs of transverse seals, each of the containers fillable with a quantity of gas and having an opening for receiving this gas, the device comprises: a conveyor system for conveying the inflatable panel along a conveyor path. The conveyor route may be defined as the route that begins with a roll of the web to be sealed and ends with the output of the fully inflated and sealed film, with the area of the conveyor route in particular, as will be explained below, being the area between a first pair of rolls and one second pair of rollers. In an embodiment, the conveyor path runs essentially parallel to the longitudinal edge(s) of the inflatable track, so that error-prone deflections of the track are eliminated. In an embodiment, it is contemplated that the web has a longitudinal edge, which is preferred for precise guidance of the web through the device.

In an embodiment, on the conveyor line after the web on the roll is, first, a first pair of contacting rollers and, then, a second pair of contacting rollers, wherein the second pair of rollers may act as traction rollers for the web. As will be explained below, each of the traction rollers may be arranged one above the other so that the contact time between web and rollers may be as short as possible and the formation of a largely "straight" conveying path may be created. Exactly vertical alignment may not be required, wherein alignment depends on the final design of the device and/or preferred design of the final inflated product.

The area between the first pair of rollers and the second pair of rollers is part of the conveying line that is essential for quality assurance of the finished web with air cushion or cushions.

The first pair of rollers may be driven by a first electric motor and the second pair of rollers may be driven by a second electric motor. As a nonlimiting example, only one roller at a time is driven directly by the motor, whether it is the uppermost or the lowermost roller that is driven. Further, in such a nonlimiting example, the other roll is driven indirectly via the directly driven roll. Such indirect driving may be induced by contact between the rollers on the outer surface of the mounting panel and/or may be induced by contact or mechanisms between the rollers on the inner surface of the mounting panel.

In another embodiment, both first rollers and/or both second rollers may be driven directly. However, the aforementioned embodiment comprising one roller driven at a time may provide a simpler design.

The motor may be electronically controlled with a speed control and may determine the speed of the transport of the web with which the web moves over the conveyor line.

The motor speed of the lower roller of the second pair of pull rollers may allow for a faster linear speed of the rollers than that of the lower drive roller of the first pair of rollers.

The second rolls (e.g., draw rolls) may not be physically connected to the first rolls except through the connection made by the web between the two pairs of rolls.

During operation of the device, the operating parameters of the second motor (current and preferably speed) may be constantly monitored and adjusted in order to ensure a stable, pre-programmed film tension regardless of the running speed.

The rollers that are in contact with one another may have a predeterminable contact pressure that depends on the material of the web and ensures that the web is transported safely through the rollers.

In an embodiment, the first pair of rollers and/or the second pair of rollers or just one roller each are spring-mounted. Such an embodiment has the advantage that a new web can easily be inserted into the device even when the device is switched off.

In addition, in such a schema, irregularities in the processing of the web cannot lead to blocking or the like.

In an embodiment, the first pair of rollers and/or the second pair of rollers, or just one roller each, are made of an elastic material, such as rubber or silicone.

The apparatus may further include an inflation system configured to direct air or gas into the openings of the containers of the web as the web is moved along the conveyor path to thereby inflate the containers.

A sealing device may also be provided for sealing the openings of the containers after they have been inflated by the inflation system.

Furthermore, a control unit may be provided, which may control the second electric motor in such a way that the at least one roller of the second pair of rollers (e.g., pulling rollers) has a constant torque.

The provision of a constant torque on at least one roller of the second pair of rollers, which may be arranged at the end of the conveying path, advantageously makes it possible, compared to the prior art, to always keep the web taut with a constant tensile force, without the risk that the tension of the web will be undesirably too high or too low, which would result in a loss of seal quality.

In an embodiment, the control unit thus ensures, via rotational force, that a tensile force acting on the web between the first pair of rollers and the second pair of rollers is kept constant. This is preferably in a range from 0.1 to 7.5 N, or more specifically, in a range from 0.5 to 3 N. As contemplated by a person of ordinary skill in the art, the material normally used for such films is optimally designed for this range.

The thickness of the films used may be in the range from 10 to 100 μm, but preferably between 15 and 40 μm.

In an embodiment, in order to provide a constant torque through the at least one roller of the second pair of rollers, the second electric motor is supplied with a constant amount of current by the control unit.

For a good seal and inflation ratio of the web, the film may be tensioned to an appropriate level immediately after the heat seal that closes the inflated receptacles (e.g., chambers). The freshly made heat seal may be very delicate (for example, soft, elastic, and sticky). Moreover, the pressure inside the chambers also may have a natural tendency to stress the heat seal.

In an embodiment, the control unit is used to set a speed of the first electric motor which drives at least one roller of the first pair of rollers. Advantageously, the speed of the transport of the web along the conveying path can be adjusted overall by varying the speed, since the speed of the second pair of rollers may be automatically adjusted due to the constant speed. As a nonlimiting example, in effect, modification of speed or torque in the first or second motor may automatically induce a correlated modification of speed or torque in the other of the two motors, such that a desired tension is maintained. Thus, in such a nonlimiting example, the control unit is preprogrammed with predetermined ratios, a function to determine such ratios, or another means to induce movement of the first motor and second motor to expressly maintain the desired tension.

At the beginning of the conveyor line, there may be a receiving structure with a spool, which is aligned orthogonally to the conveyor line, for rotatably supporting a roll of the inflatable web, the unwinding speed of which may be determined by the rotational speed of the first rollers.

At least one guiding element for the web can be provided between the receiving structure and the first pair of rollers, wherein the at least one guide element exactly aligns the web in relation to the first rollers and the sealing device, for example, wherein the relevant longitudinal edge of the web is positioned by the guide.

According to an embodiment of the invention, the sealing device is formed by the first pair of rollers, one of the rollers being provided with a heating device which extends over the entire circumference of the roller.

Advantageously, in such an embodiment, no separate sealing device has to be provided independently of the rollers, which would unnecessarily increase the conveying distance and thus the size of the device.

However, it is also possible according to the disclosure to provide a sealing device between the first pair of rollers and the second pair of rollers or also in front of the first pair of rollers, for example, between the first pair of rollers and the receiving structure, since the setting of a constant tensile force according to the disclosure also in these areas is an optimal tension of the web for sealing.

When the sealing device is arranged between the first pair of rollers and the second pair of rollers or in front of the first pair of rollers, a counter-holder may be arranged between the heating element, such that the heating element can apply a defined pressure to the web.

The heating element and the counter-holder may be arranged in a resilient manner in relation to one another in order to always maintain the necessary contact with the web during heating.

The control unit may be set up to monitor and/or adjust the temperature of the heating device of the sealing device, for example, by means of a temperature sensor.

There are various embodiments of the inflatable web. Thus, the longitudinal edge of the web facing the device can be designed to be open or can be provided with an inflation channel, into which the openings of the containers open. Accordingly, depending on the design of the inflatable web or other web characteristics, the design of the inflation system may be configured to operate with such designs.

The film material can be a multi-layer web and can be made from either a roller web, a flat film tube or two different roller webs, which may be adapted for use with the system herein.

However, the geometry and arrangement of the bubbles in the air cushion films can be designed differently, depending on how the air ducts and seals are routed along and transversely disposed to the conveying direction of the film material. These bubbles can be round, angular and/or oval with varying sizes, and both regular and/or irregular grid-like structures can be produced, which are prefabricated in the film material according to their desired application.

In the case of the web, which is designed to be open along the longitudinal edge, a means (e.g., a wedge-shaped guide) is provided which fans out the web so that gas is blown through the means with a gas outlet opening facing the opening of the web, which then gets into the openings of the containers and is then enclosed with the sealing unit.

The situation may be different with the track with inflation channel. In such an embodiment, the inflation system comprises an elongated inflation nozzle running parallel to the conveying line, which is introduced into the inflation channel of the track at the start of operation, so that the injected gas enters the openings of the containers, and these are inflated.

The inflation nozzle may be attached to a holder which is arranged on or leads out of the housing of the device, e.g., the mounting panel.

In an embodiment, the inflation nozzle or its holder is guided out of a housing of the device in the area between the first pair of rollers and the second pair of rollers and then extends parallel to the conveying direction in the direction of the support structure, with the end of the inflation nozzle leading beyond the first pair of rollers. The at least one gas outlet opening may be arranged on the side of the inflation nozzle and points accordingly to the openings of the containers, which are inflated by escaping gas and then sealed. Depending on the embodiment of the device, it may also be possible to guide the inflation nozzle or its holder out of the housing in front of the first pair of rollers and to place it in relation to the track.

In order for the inflation nozzle to be again withdrawn from the inflation channel, it must be opened at the latest point at which the inflation nozzle emerges from the device. As a nonlimiting example, a means is provided between the first pair of rollers and the second pair of rollers, wherein said means is designed to open the inflation channel and to open the web during transport on the conveyor line.

In one embodiment, the means is a blade, which is preferably arranged in the area of the elongate inflation nozzle or its support behind the sealing unit. However, the blade may also be mounted inside the inflator and emerge from it through an opening.

Advantageously, the torque setting according to the present disclosure facilitates the level of tension required to cut the film.

The blade may be arranged in a resilient manner in order to ensure optimum pressure and to compensate for fluctuations, in particular also when the first rollers rotate at different speeds, for example, at a higher transport speed.

For optimal and damage-free transport of the web or the inflated web, the second pair of rollers may be arranged in such a way that they are located at the edge of the conveyor section and act on the inflation channel and not on the sealed openings of the containers. The same applies to differently designed tracks.

In an embodiment, the first pair of rollers is arranged in such a way that they act on the web further from the longitudinal edge.

Such an embodiment may be of particular importance when the heating device is arranged to rotate on one of the rollers of the first pair of rollers. This advantageously prevents a fresh sealed seam from being damaged by the second rollers.

According to an embodiment, the device has a torque limiter in order to set the torque to a maximum value or to interrupt the flow of torque in the event of a fault.

The torque limiter may be adjusted by means of the control unit.

The torque limiter may be a magnetic powder clutch, however, other suitable torque limiter components or techniques may be utilized.

In an embodiment, the device comprises a data memory assigned to the control unit, in which parameters for setting the tensile force for selected materials of the web are stored, wherein the parameters include, but are not limited to, torque, speed, material, film thickness, and temperature of the heating element.

Other parts and devices that are not described but are necessary for the function of the device, such as wiring, operating elements, switches, indicator lights, air blower or compressor, air duct, and the like are known to a person of ordinary skill in the art and are selected, designed, and used accordingly by said person of ordinary skill in the art.

The methods and devices contemplated herein are explained in more detail below with reference to the figures.

Figure 3:
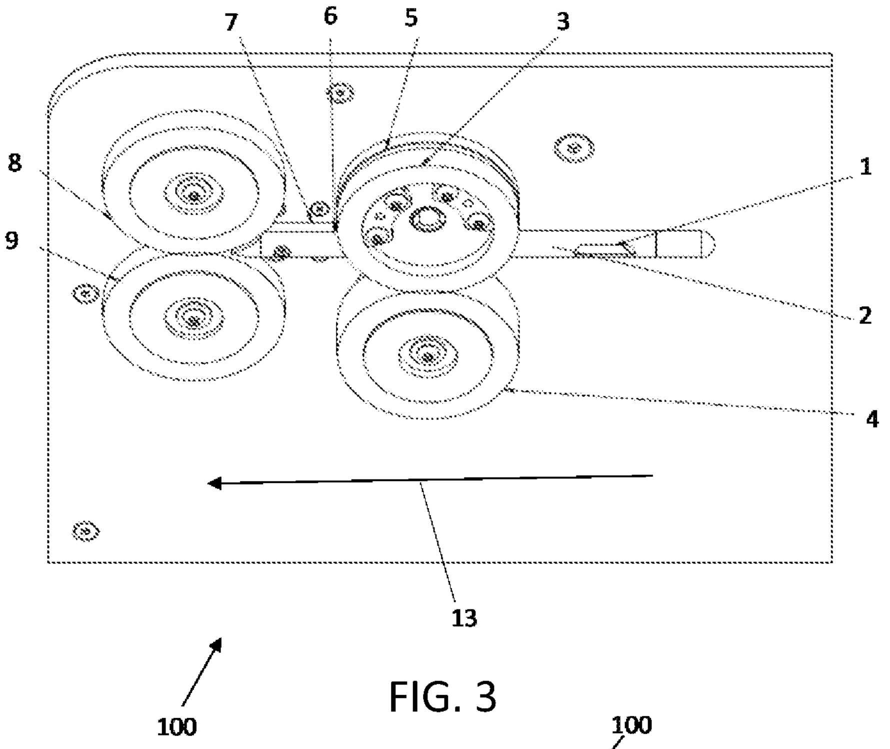
FIG. 3 is a perspective detailed view of a device according to the present disclosure.
Figure 4:
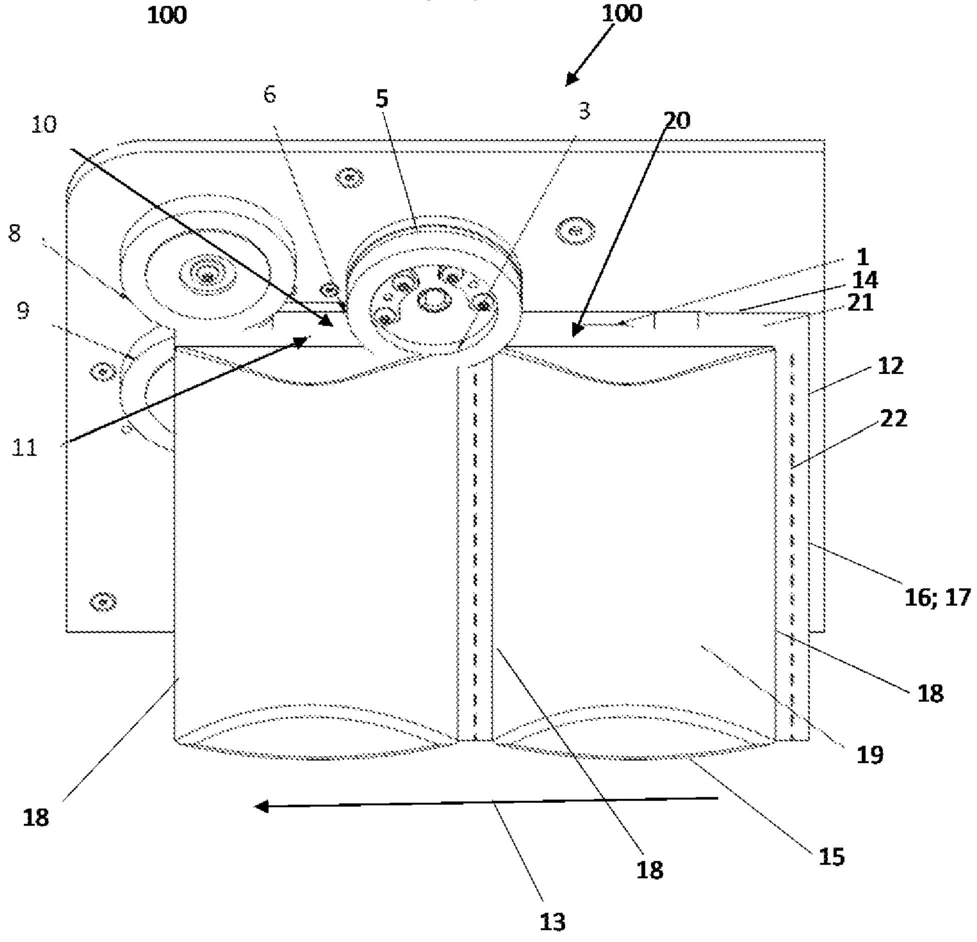
FIG. 4 is a perspective detailed view of a device according to the present disclosure.

FIG. 3 is a perspective detailed view of the device according to the present disclosure. FIG. 4 is a perspective detailed view of the device, showing a section of a web arranged on the conveyor line. For the purposes of this disclosure "film web," "inflatable sheet," "inflatable web," and the like may be used as different nomenclature for the same element. The film web 12 may be composed of a plastic material or any suitable heat-sealable material. The film web 12 may be composed of thermoplastic polymers such as polyethylene or polypropylene homopolymers or copolymers. The film web 12 may be composed of polyethylene homopolymers like low density polyethylene (LDPE) and high-density polyethylene (HDPE), and polyethylene copolymers, such as B. Ionomers, EVA, EMA, heterogeneously catalyzed ethylene/alpha-olefin copolymers and homogeneously catalyzed (e.g., ethylene/alpha-olefin copolymers). Ethylene/alpha-olefin copolymers may be utilized, including LLDPE (linear low-density polyethylene), LMDPE (linear medium density polyethylene), VLDPE (Very Low-Density Polyethylene) and ULDPE (Ultra Low-Density Polyethylene). Various other polymeric materials can also be used, such as polypropylene homopolymer or polypropylene copolymer (e.g., propylene/ethylene copolymer), polyesters, polystyrenes, polyamides, polycarbonates, and the like. Moreover, the film web 12 may be composed of compostable, recycled, and/or recyclable materials.

FIGS. 3 and 4 show a detailed side view of a device 100 according to the present disclosure, along which part of the conveying path for a film web 12 (FIG. 4) runs, the conveying direction 13 being symbolized by an arrow.

The film web 12 to be inflated (e.g., prefabricated film) may first be placed in the form of a roll of material on a carrier structure 37, which is located on the device 100 at the beginning of the conveyor section 13. The carrier structure 37 may be an elongated member configured to accept a roll (or other configuration) of the film web 12. The carrier structure 37 may be fixed and/or may be free-spooling. In a further embodiment, the carrier structure 37 is mechanically linked with a motor configured to feed the film web 12. However, as discussed herein, the carrier structure 37 may be fixed and one or more of the rollers 3, 4, 8, 9 may be equipped with one or more motors to manage the movement of the film web 12.

In an embodiment, the web of film 12 comprises parallel longitudinal edges 14, 15 and a pair of films 16, 17 sealed together by transverse seals 18, forming a succession of inflatable containers 19 between pairs of transverse seals 18. In such a condition, each of the containers 19 may have an amount of gas sufficient to fill each of the containers 19 and, further, may include an opening 20 for receiving said gas. The openings 20 of the containers 19 open into an inflation channel 21, which is closed along the longitudinal edge 14 adjacent to the device 100. The device 100 described herein is configurable with any suitable input film 12. For example, although FIGS. 3 and 4 depicts an exemplary embodiment showing rectangular inflatable containers 19 bound by longitudinal edges 14, 15 orthogonal to transverse seals 18, the device 100 may be configured to seal and inflate containers 19 of any suitable geometry. As a non-limiting example, the container 19 may be formed by film 12, for example, having a top side and a bottom side, wherein the top side and/or the bottom side are wavy or segmented to form a plurality of subcontainers within the container 19. In such a non-limiting example, each of the subcontainers may be in fluid connection, such that inflation of the container 19 inflates each of the subcontainers. Thus, for the purpose of this disclosure, “subcontainers” may not be independent volumes, but instead connected portions of the container 19 configured to create padding or the “bubbles” in bubble wrap. Yet further, the device 100 may be programmable to inflate and seal containers 19 separated by variable dimension transverse seals 18 and/or longitudinal edges 14, 15. In various non-limiting examples, the transverse seals 18 along a given portion of web 12 may be different lengths or widths, for example, following a predetermined pattern as selected for a particular application. Accordingly, in such nonlimiting examples, the control unit may be programmed to account for air output, sealing, and heating the length of the film 12 while accounting for the possible patterns of the web 12.

In order to put the device 100 into operation, the film web 12 may be manually inserted into the device 100 over the entire conveying path 13.

The film web 12 may be initially guided via one or more guide elements 38. For example, the one or more guide elements 38 may be protrusions disposed between the carrier structure 37 and the rollers 3, 4, 8, 9, the one or more guide elements 38 configured to direct the flow of film 12 into the rollers 3, 4, 8, 9. In an embodiment, the film web 12 is drawn over an inflation nozzle 2, which has the task of directing gas into the individual containers 19 of the preconfigured film web 12 via an inflation opening 1 and of guiding the film web 12 along the device 100. For this purpose, the inflation nozzle 2 may be introduced into the inflation channel 21 of the film web 12. The inflation channel 21 may be a portion of the film web 12, wherein gas may be introduced by the inflation nozzle 2. For example, the inflation channel 21 may be a continuous or segmented separation between the upper and lower layers of the film 12, enabling fluid communication between the inside of the containers 19 and the gas source. In alternative embodiments, the inflation nozzle 2 and/or other components of the device 100 may be configured to inflate the container(s) 19 in instances where an inflation channel 21 is not exposed and/or where such an inflation channel 21 does not exist. Such alternative methods may include simultaneous puncture and inflation or precutting the material before inflation. The inflation nozzle 2 may be attached to a support (not shown) disposed inside the device 100 and may enable the transfer of air (or another suitable gas) from a gas conveyor (not shown), to an inflation opening 1 located on the inflation nozzle 2 and to the openings 20 of the containers 19 as directed. In an embodiment, the gas conveyor is a blower, wherein the blower may operate at a low-pressure ratio, such that the blower is less violent than an air compressor. The gas conveyor may be disposed within the chassis of the device 100. As a nonlimiting example, the use of a blower as opposed to, for example, a compressor may decrease the vibration imparted onto the device 100 and/or film web 12 during operation. In instances where an air compressor or excessive gas outflow is used, the top and bottom layers of the film web 12 may violently flutter against one another, causing the film web 12 to vibrate. Such unwanted vibrations may decrease the accuracy of the device 100, may induce excessive noise, and may downplay the beneficial effects of the tension-inducing roller configuration. Thus, the inflation channel 21 is configured, in conjunction with use of a blower, to mitigate the high flow resistance and/or Bernoulli forces that would otherwise cause the two layers of the inflation channel 21 to beat against each other. Yet further, the relatively short “inflation period” of this process (for example, the duration and distance between the entry of air and the sealing of material) may decrease such previously mentioned undesired effects by shortening the potential length of disjointed film layers. In alternate embodiments, the device 100 may be configured for use with an external air compressor and/or an external air blower. In such alternate embodiments, the device 100 may include a connectable gas interface, allowing external air conveyors to be used.

Only two containers 19 are shown in FIG. 4, wherein, in practice, a large number of containers 19 may be present. As can also be seen in FIG. 4, these can be separated from one another via a perforation line 22. In various embodiments, the perforation line 22 may be disposed at any suitable frequency, for example, between every container 19 and/or between every twenty (20) containers 19. The perforation line 22 may be configured such that the force required to separate the containers 19 along the perforation line 22 is greater than the force imparted on the perforation line 22 by the tension of the rollers 3, 4, 8, 9.

Furthermore, the film web 12 may then be fed to a first pair of rollers 3, 4 (e.g., the sealing device) and then to a second pair of rollers 8, 9 (e.g., the pair of pull rollers) and the operation of the device 100 is initiated.

In the sealing device, the upper roller 3 may represent the sealing roller, which may be provided with a rotating heating element 5. In an embodiment, the lower roller 4 serves as a driving roller. Both rollers 3, 4 may rest against one another, such that the lower drive roller 4 induces movement in the upper sealing roller 3. The preconfigured film web 12 may be transported between these rollers 3, 4.

The device described herein may include a cutting device consisting of a blade holder and blade (not shown), wherein the cutting device may be attached at position 6 downstream of the sealing device in the conveying direction 13. The holder and blade may be located between the first pair of rollers 3, 4 and the second pair of rollers 8, 9. The blade, for example, installed in the holder with a spring mechanism, may be guided through an opening (not shown) on the inflation nozzle 2 such that the pre-configured inflation channel 21 of the film web 12 may be opened after the point of contact between the sealing roller 3 and the lower drive roller 4, and the film web 12 may thus be detached from the inflation nozzle 2. The cutting device may be tasked with cutting the film web 12 after the film web 12 has been sealed, such that the film web 12 may escape the inflation nozzle 2. In one embodiment, the blade may be disposed in the inflation nozzle 2, for example, protruding and facing towards the mounting panel 24, such that the film web 12 is cut at the outermost perimeter of the film web 12, to reduce material waste and provide symmetrical "frills" in the final product. Accordingly, such a cut may provide a product with reduced waste and a product with an aesthetically pleasing profile. In one embodiment, the blade may be disposed in the mounting panel 24 and may protrude towards and face the inflation nozzle 2. In various embodiments, the blade may transverse the shortest distance between the inflation nozzle 2 and the mounting panel 24. In alternate embodiments, for particular desired circumstances, the blade may protrude from the air nozzle 2 at angles other than parallel to the film web 12, for example, providing a vertical upward cut or a vertical downward cut.

In an embodiment, downstream in the conveying direction 13 is a second pair of rollers 8, 9, which comprises a lower drive roller 9 and an upper roller 8 and serves as a pair of traction rollers. The first pair of rollers 3, 4 and the pair of pull rollers 8, 9 may be arranged offset to one another, with the pair of pull rollers 8, 9 being arranged in such a way that one or more of the pull rollers 8, 9 may be located behind and/or adjacent to a sealing seam 10 formed by the sealing roller 3 on the longitudinal side of the film web 12 leading to the device 100 is aligned, runs, and, thus, the sealing seam 10 is not damaged by the pressure of the second pair of rollers 8, 9. The pair of pull rollers 8, 9 permit motion of the gas-filled film web 12 along the conveying path 13 under controlled tension, such that both a very good sealing seam quality and a very good cut of the film material are ensured.

At least one of the rollers of each pair of rollers 3, 4; 8, 9 consists of an elastic material, e.g., rubber or silicone. In an embodiment, rollers 4, 8, 9 may be composed of a rubber and/or elastic material. Accordingly, in such an embodiment, roller 3 may be composed of heat resistant material, such that operation of the heating element 5 does not degrade the integrity of roller 3.

The first pair of rollers 3, 4 may be driven by a first electric motor and the second pair of rollers 8, 9 may be driven by a second electric motor. In such an embodiment, the operation of the first electric motor and/or the second electric motor takes place in such a way that the tensile force acting on the film web is kept constant during operation.

In an embodiment, the pull rollers 8, 9 are not physically connected to the rollers 3, 4 of the sealing device, except by the connection formed by the web of film 12 between the two sets of rollers 3, 4; 8, 9 being produced. During operation of the device 100, the operating parameters of the pull roller motor (e.g., second electric motor) current and speed are constantly monitored so that this supplies the pull rollers 8, 9 with a constant torque in order to maintain a stable, pre-programmed film tension in the range 11 between the first pair of rollers 3, 4 and the second pair of rollers 8, 9.

Figure 5:
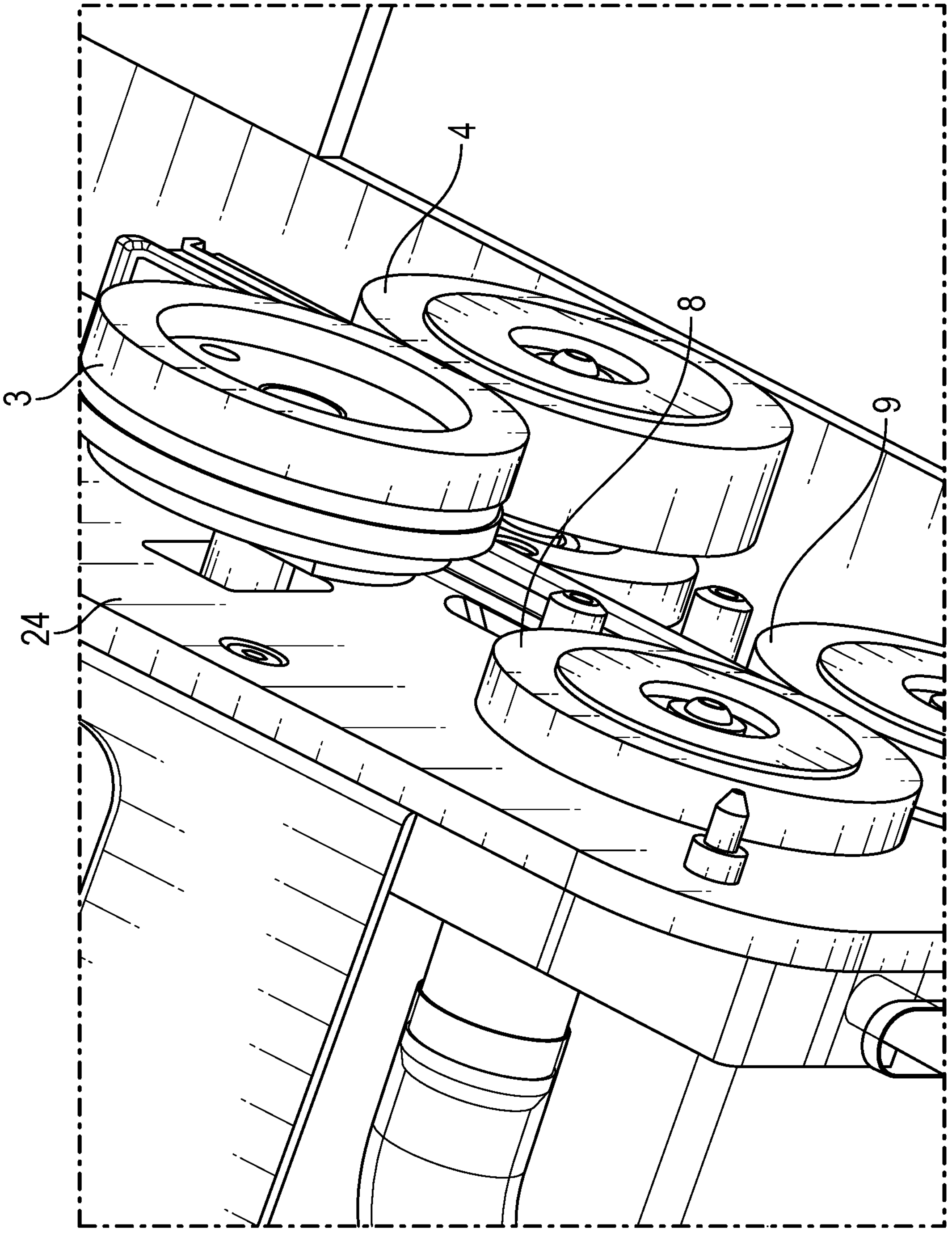
FIG. 5 is a view of a device and a roller arrangement thereof according to the present disclosure.

Referring to FIG. 5, the rollers 3, 4 may be positioned such that the outermost surface of the rollers 3, 4 is a greater distance from the mounting panel 24 than the outermost surface of the rollers 8, 9. Accordingly, such a distance differential may facilitate a seamless feeding of the inflatable sheet material and/or provide sufficient space and surface area for the functionality of the heating element 5, which may be disposed in one or more of rollers 3, 4. Additionally, by providing the sealing roller 3 at a distance beyond the rollers 8, 9 the cutting of the film web 12 may be sufficiently separated from the seal, mitigating undesired tear of the seal during the cutting process. Thus, in an embodiment, the rollers 3, 4 may have a greater thickness than rollers 8, 9. However, in alternate embodiments, the rollers 3, 4 and rollers 8, 9 may be any suitable size or dimensions.

Figure 6:
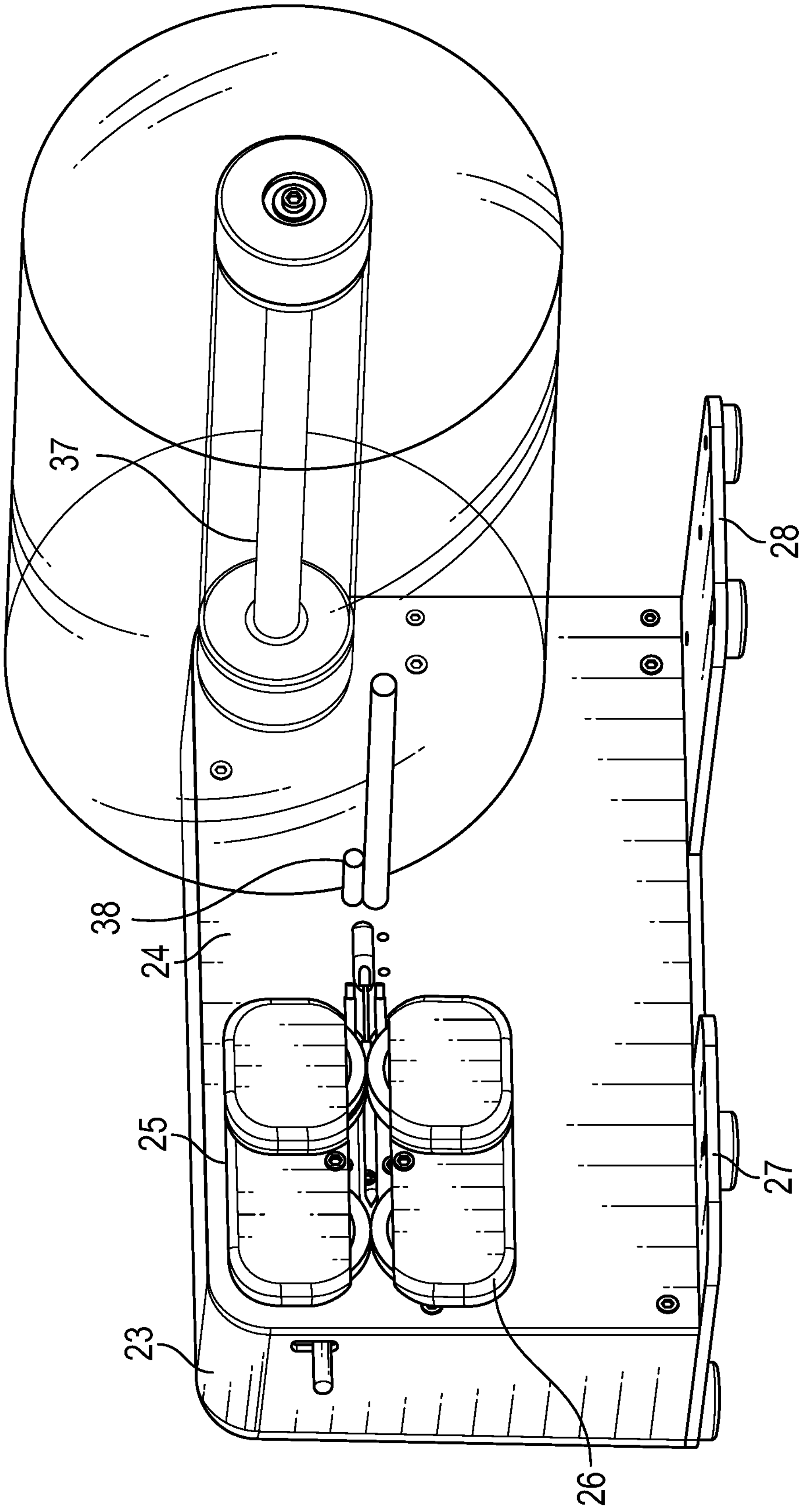
FIG. 6 is a front perspective view of a device according to the present disclosure.

Referring to FIG. 6, the device 100 may be encapsulated by a chassis 23 configured to house internal components of the device 100 (e.g., computerized elements such as the control unit, air tubing for inflation, wiring, etc.), wherein the chassis 23 may include a mounting panel 24 adapted to hold the rollers 3, 4, 8, 9 and the inflatable sheet material itself. Further, the chassis 23 may include a first foot 27 and/or a second foot 28. The first foot 27 and/or the second foot 28 may be configured to stabilize the device 100 and/or the chassis 23 during operation of the device 100. As a nonlimiting example, the second foot 28 may be of a greater length than the first foot 27 as the second foot 28 may be adapted to support the weight of the to-be-used inflatable sheet material, which may protrude relatively far from the mounting panel 24. Further, the first foot 27 may be of a shorter length than the second foot 28 as the first foot 27 may accommodate the outflow of inflated and sealed sheets, wherein the shorter foot (i.e., the first foot 27) is not obstructive to final output of the device 100. Accordingly, the configuration of the chassis 23, the first foot 27, the second foot 28, and/or other considerations (e.g., the use of an internal lightweight air blower as opposed to an external heavy air compressor) may allow the device 100 to be used in a table-top capacity.

The device 100 may include an upper shielding 25 and/or a lower shielding 26 disposed over one or more of the rollers 3, 4, 8, 9. The upper shielding 25 and/or the lower shielding 26 may be sized to the geometries of the rollers 3, 4, 8, 9. For example, the upper shielding 25 may include a raised portion disposed adjacent to the roller 3 and a depressed portion adjacent to the roller 8. As another example, the lower shielding 26 may include a raised portion disposed adjacent to the roller 4 and a depressed portion adjacent to the roller 9. The geometry (e.g., the raised portions, depressed portions, and the unobtrusive design) of the upper shielding 25 and/or the lower shielding 26, as described above, may be configured to improve safety (for example, prevent unwanted material from entering or exiting the area around the rollers 3, 4, 8, 9) and/or mitigate environmental effects (for example, drafts or temperature swings that would otherwise impact the heating, cooling, or inflation processes).

Figure 7:
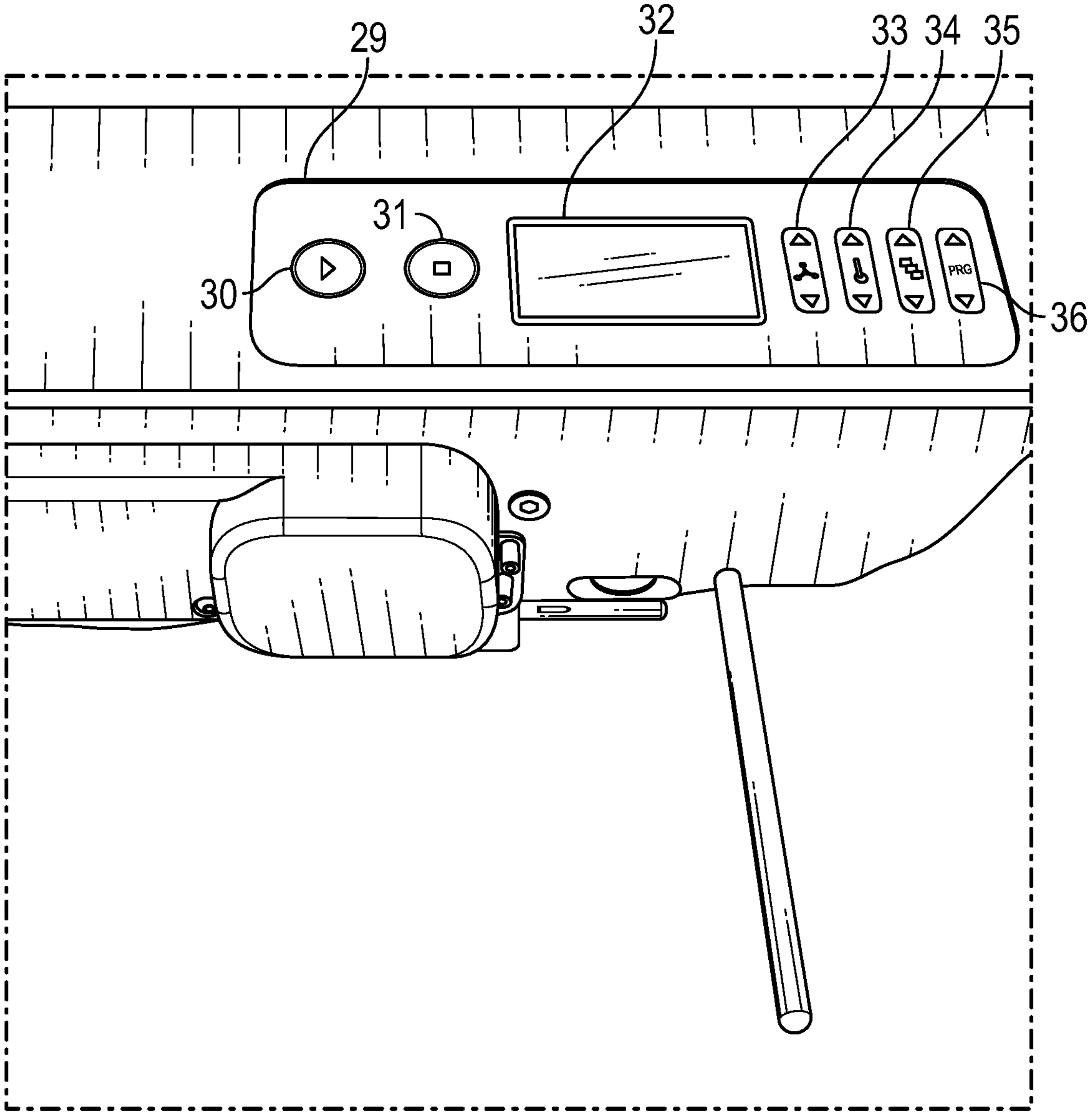
FIG. 7 is a top perspective view of a device according to the present disclosure.

Referring to FIG. 7, the device 100 may include a control interface 29. The control interface 29 may be disposed on a top portion of the chassis 23. The control interface 29 may be in communication with the control unit, such that the actuation of various components of the control interface 29 impacts the functioning of the inflation and sealing processes. The control interface 29 may include a start button 30 configured to initiate movement in the one or more motors. The control interface 29 may include a stop button 31 configured to cease the movement in the one or more motors. Accordingly, the start button 30 and/or the stop button 31 may be actuated to override the current state of the underlying process. For example, if the device 100 is executing a programmed process, the stop button 31 may immediately stop said process (e.g., akin to a failsafe or emergency brake). Further, the start button 30 may be configured to immediately start said process, for example, if the process has not yet begun. The display 32 may be configured to display the current status of the underlying process, for example, run time, amount of material processed, the temperature of the device, etc. The control interface 29 may include a blower speed selection 33, a temperature selection 34, a speed selection 35, and/or a program selection 36. The blower speed selection 33 may be in communication with the control unit and/or the air conveyor/blower. Accordingly, actuation of the blower speed selection 33 may inform the air conveyor/blower to increase or decrease the output gas/air speed, volume, etc. In various embodiments, the blower speed selection 35 may be configurable in one or more blower speed modes, wherein each of the blower speed modes is a discrete programmed instruction inducing the air conveyor/blower to output a predetermined speed or volume of gas/air. The temperature selection 34 may be in communication with the control unit and/or heating element 5. Accordingly, the temperature selection 34 may be configured to adjust the temperature output of the heating element 5. In various embodiments, the temperature selection 34 may be configurable in one or more temperature modes, wherein each of the temperature modes is a discrete programmed instruction inducing the heating element 5 to output a predetermined temperature or related characteristic(s). The speed selection 35 may be in communication with at least the control unit and/or one or more of the motors, wherein the speed selection 35 may be configured to alter the speed at which the one or more motors operate. For example, actuation of the speed selection 35 may increase or decrease the speed of the inflation and sealing processes. Alternatively, the speed selection 35 may alter the duration for which the inflation and sealing processes run, for example, tailored to a desired quantity or volume of inflatable sheets. The speed selection 35 may be configurable in one or more discrete speed settings correlating to the rotational speed of one or more of the motors and/or the number of inflatable sheets to be inflated in a given duration. The program selection 36 may be in communication with at least the control unit, wherein the program selection 36 is configured to select one or more programs stored within the control unit. As a nonlimiting example, the control unit may be preprogrammed with a plurality of programs, wherein each program correlates to particular speeds, temperatures, runtimes, etc., and wherein selection of the program is conducted by a user via the program selection 36 and/or the display 32. In various embodiments, the device 100 may include any suitable number of selection tools, interface elements, or peripherals enabling modification of aspects of the processes described herein.

The control unit may embody one or more of the components and/or characteristics recited above in reference to the electronic device 200 or FIG. 2. Accordingly, the program instructions described above may be stored in the memory 230, for example, for execution by the CPU 202. Moreover, the various control interface 29 components may follow the path as dictated by the I/O interfaces 240 as shown in FIG. 2.

In further embodiments, the device 100 may embody one or more of the components or aspects of the client devices 102-106, as described above, and as shown in FIG. 1. As a nonlimiting example, one or more devices 100 may be in informatic communication with one or more servers 107-109, 113, wherein the one or more servers 107-109, 113, may direct operation of each of the devices 100. Accordingly, such an arrangement may be directed to an embodiment wherein a plurality of devices 100 may be used en masse, for example, in a larger manufacturing capacity.

As described above, in an embodiment, the sealing method of the device 100 comprises the use of two rollers, where the bottom roller is elastic and is a drive wheel and the top roller is a sealing drum with an integrated heating element on the top roller's surface.

As described above, in an embodiment, the inflation method uses an air tube (e.g., a guide air tube) disposed behind the sealing roller, which goes into the gas/air nozzle opening and projects gas/air inside each container before reaching the sealing rollers.

As described above, in an embodiment, the channel opening method utilizes a blade fixed with a spring mechanism to a bracket inside of the device 100, which goes into an opening in the air nozzle. The air nozzle may then be fixed with only one screw to the bracket or mounting panel for easy blade replacement.

As described above, in an embodiment, the device 100 comprises two tension rollers pressed together, where the bottom roller of the two tensions rollers is a drive wheel and the top roller of the two tension rollers is a driven wheel powered with a separate motor, for example, with an electronic momentum control system (e.g., integrated in the control unit) to provide constant tension of the film edge after heat sealing and at the cutting point.

As contemplated throughout the disclosure, a critical aspect of improving prior art processes includes maintaining the right tension of the film after producing the heat seal that closes containers in the preconfigured material following inflation in order to produce accurate and enduring sealing and inflation ratio of the cushioning material. Accordingly, the newly formed heat seal may be soft, stretchy, and sticky, making it exceedingly brittle. As is the case with heat sealing, there may be a natural tendency to crease under the pressure inside the chambers. When one side (for example, the side of the film along the cutting blade) of the film is dragged too hard, a similar effect is seen. However, for a successful cut, a specific amount of tension is required at the cutting spot. Traditional packaging material inflation and cutting systems are found to be not optimal, which created a need to develop a new solution that allows working with a wide variety of different films with many different coefficients of friction, thicknesses, and melting points. Accordingly, as contemplated above, preprogrammed sets of settings may be created including, sealing temperature, speed, and the tension force through this solution.

The device can be equipped with many sets of adjustments, including voltage parameters, which allows stable operation with many types of materials with different thicknesses and sealing properties.

The present disclosure may provide a method of inflating and sealing an inflatable sheet (12) having opposing longitudinal edges (14, 15) and a pair of films (16, 17) sealed together by transverse seals (18) forming a sequence of inflatables Forming containers (19) between pairs of transverse seals (18), each of the containers (19) being fillable with a quantity of gas and having an opening for receiving the gas, comprising the following steps: a. Conveying the inflatable web (12) along a conveyor route (13) by means of a first pair of mutually contacting rollers (3, 4) and by means of a second pair of mutually contacting rollers (8, 9), which are arranged one behind the other on the conveyor route (13), wherein a first electric motor drives at least one roller of the first pair of rollers (3, 4) and a second electric motor drives at least one roller of the second pair of rollers (8, 9), b. Inflating the containers (19) by introducing gas while the web (12) is moved along the conveying path (13), c. Sealing the openings (18) of the containers (19) after inflation, and d. Controlling the second electric motor in step a) such that at least one roller of the second pair of rollers (8, 9) exerts tension on the web with a constant torque.

In an embodiment, the method may further comprise adjusting a speed of the first electric motor to adjust the speed of transport of the web (12).

The present disclosure may provide a device (100) for inflating and sealing an inflatable sheet (12) having opposing longitudinal edges (14, 15) and a pair of films (16, 17) sealed together by transverse seals (18), the one A series of inflatable containers (19) between pairs of transverse seals (18), each of the containers (19) being fillable with a quantity of gas and having an opening for receiving the gas, the device comprising: a. a conveyor system for conveying the inflatable track (12) along a conveyor route (13), having a first pair of mutually contacting rollers (3, 4) and a second pair of mutually contacting rollers (8, 9), between which the web (12) can be arranged and which are arranged one behind the other on the conveyor line (13), wherein a first electric motor is provided to drive at least one roller of the first pair of rollers (3, 4) and a second electric motor is provided to drive at least one roller of the second pair of rollers (8, 9), b. an inflation system designed to direct gas into the openings (18) of the containers (19) while the web (12) is moved along the conveyor path (13) to thereby inflate the containers (19), c. a sealing device for sealing the openings (18) of the containers (19) after they are inflated by the inflation system, and d. a control unit which is set up to control the second electric motor in such a way that the at least one roller of the second pair of rollers (8, 9) has a constant torque.

The device (100) may be characterized in that the control unit is set up to adjust a speed of the first electric motor.

The device (100) may be characterized in that the control unit is set up to exert a tensile force acting on the web (12) between the first pair of rollers (3, 4) and the second pair of rollers (8, 9). to be kept constant, preferably in a range from 0.1 to 7.5 N, particularly preferably in a range from 0.5 to 3 N.

The device (100) may be characterized in that in order to provide a constant torque through the at least one roller of the second pair of rollers (8, 9), the second electric motor is supplied with a constant amount of power.

The device (100) may be characterized in that the sealing device is formed by the first pair of rollers (3, 4), one of the rollers being provided with a heating device (5) which is located above the extends to the entire extent of the role.

The device (100) may be characterized in that the sealing device is arranged between the first pair of rollers (3, 4) and the second pair of rollers (8, 9) and a heating element for essentially punctual Heating and preferably having a counterholder.

The device (100) may be characterized in that the control unit is set up to monitor and/or adjust the temperature of the heating device of the sealing device.

The device (100) may be characterized in that the inflation system includes means to inflate the web along the longitudinal edge (14) of the web (12) to which the opening (18) of the containers (19) faces, extending to fan out, and means having at least one gas outlet opening located adjacent the longitudinal edge (14) of the web to inflate the containers (19).

The device (100) may be characterized in that the inflation system has an elongated inflation nozzle (2) running parallel to the conveying section (13), which is designed in a manner extending along the longitudinal edge (14) the inflation channel (21) extending along the web (12) and into which the openings (18) of the containers (19) open, to be locatable while the web (12) is being moved along the conveying path (13).

The device (100) may be characterized in that the elongate inflation nozzle (2) extends at least partially between the first pair of rollers (3, 4) and the second pair of rollers (8, 9).

The device (100) may be characterized in that between the first pair of rollers (3, 4) and the second pair of rollers (8, 9) a means is provided which is designed to close the inflation channel (21) to open a web (12) during transport on the conveyor line (13).

The device (100) may be characterized in that the means for opening the inflation channel (21) is a blade.

The device (100) may be characterized in that the second pair of rollers (8, 9) is arranged in such a way that they are located at the edge of the conveyor section (13) and that the first pair of rollers (3, 4) are arranged on the conveyor section (13) further from the edge of the conveyor section (13), so that the surfaces of the conveyor section (13) covered by the two pairs of rollers (3, 4; 8, 9) preferably do not overlap.

The device (100) may be characterized in that the device (100) has a torque limiter in order to set the torque to a maximum value in the event of a fault or to interrupt the torque flow.

The device (100) may be characterized in that the control unit has a data memory in which parameters for setting the tensile force for selected materials of the web are stored, the parameters being selected from torque, speed/speed, material, film thickness, temperature and heating element.

Finally, other implementations of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

Various elements, which are described herein in the context of one or more embodiments, may be provided separately or in any suitable subcombination. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It will be further understood that various changes in the details, materials, and arrangements of the parts that have been described and illustrated herein may be made by those skilled in the art without departing from the scope of the following claims.

All references, patents and patent applications and publications that are cited or referred to in this application are incorporated in their entirety herein by reference. Finally, other implementations of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

The invention claimed is:

1. A method for inflating and sealing an inflatable sheet, comprising the steps of:
   a. conveying an inflatable sheet along a conveyor route by means of a first pair of rollers and by means of a second pair of rollers, which are arranged one behind the other on the conveyor route, wherein a first electric motor drives at least one roller of the first pair of rollers and a second electric motor drives at least one roller of the second pair of rollers, the inflatable sheet comprising opposing longitudinal edges and a pair of films sealed together by transverse seals forming a sequence of containers between pairs of transverse seals, each of the containers being fillable with a quantity of gas and having an opening for receiving the gas;
   b. inflating the containers by introducing the gas while the inflatable sheet is moved along the conveying path;
   c. sealing the openings of the containers after inflation; and
   d. controlling the second electric motor in step a) such that at least one roller of the second pair of rollers exert tension on the inflatable sheet with a constant torque.

2. The method according to claim 1, wherein the first pair of rollers are mutually contacting and the second pair of rollers are mutually contacting.

3. The method according to claim 1, further comprising the step of: adjusting a speed of the first electric motor to adjust the speed of transport of the inflatable sheet.

4. A device for inflating and sealing an inflatable sheet, the device comprising:
   a. a conveyor system for conveying the inflatable sheet along a conveyor route, the conveyor system comprising:
   a first pair of mutually contacting rollers and a second pair of mutually contacting rollers, between which the inflatable sheet can be arranged and which are arranged one behind the other on the conveyor line, wherein a first electric motor is provided to drive at least one roller of the first pair of mutually contacting rollers and a second electric motor is provided to drive at least one roller of the second pair of mutually contacting rollers;
   b. an inflation system configured to direct gas into openings of containers of the inflatable sheet while the inflatable sheet is moved along the conveyor path to thereby inflate the containers;
   c. a sealing device for sealing the openings of the containers after the containers are inflated by the inflation system; and
   d. a control unit which is configured to control the second electric motor to induce a constant torque in at least one of the second pair of mutually contacting rollers.

5. The device according to claim 4, wherein the control unit is configured to adjust a speed of the first electric motor.

6. The device according to claim 4, wherein the control unit is configured to exert a tensile force acting on the inflatable sheet between the first pair of mutually contacting rollers and the second pair of mutually contacting rollers to maintain a constant force, wherein the constant force is in a range from 0.1 to 7.5 N.

7. The device according to claim 6, wherein the constant force is in a range from 0.5 to 3N.

8. The device according to claim 4, wherein in order to provide a constant torque through the at least one roller of the second pair of mutually contacting rollers, the second electric motor is supplied with a constant amount of power.

9. The device according to claim 4, wherein the sealing device is formed by the first pair of mutually contacting rollers, one of the rollers being provided with a heating element.

10. The device according to claim 4, wherein the sealing device is disposed between the first pair of mutually contacting rollers and the second pair of mutually contacting rollers and a heating element configured for immediate heating.

11. The device according to claim 9, wherein the control unit is configured to monitor and adjust the temperature of the heating element of the sealing device.

12. The device according to claim 4, wherein the inflation system is configured to inflate the inflatable sheet along a longitudinal edge of the inflatable sheet to which the opening of the containers faces, and comprising at least one gas outlet opening located adjacent the longitudinal edge of the inflatable sheet to inflate the containers.

13. The device according to claim 4, wherein the inflation system comprises an elongated inflation nozzle running parallel to the conveying section, configured for extending along the longitudinal edge, the inflation channel extending along the inflatable sheet and into which the openings of the containers open.

14. The device according to claim 13, wherein the elongated inflation nozzle extends at least partially between the first pair of mutually contacting rollers and the second pair of mutually contacting rollers.

15. The device according to claim 4, wherein between the first pair of mutually contacting rollers and the second pair of mutually contacting rollers a cutting means is provided which is configured to open the inflatable sheet during transport on the conveyor line.

16. The device according to claim 15, wherein the cutting means for opening the inflatable sheet is a blade.

17. The device according to claim 7, wherein the second pair of mutually contacting rollers is arranged in such a way that they are located at the edge of the conveyor section and that the first pair of mutually contacting rollers are arranged on the conveyor section further from the edge of the conveyor section, such that the surfaces of the conveyor section covered by the first pair of mutually contacting rollers and the second pair of mutually contacting rollers do not overlap.

18. The device according to claim 4, wherein the device comprises a torque limiter configured to set the torque to a maximum value in the event of a fault or to interrupt the torque flow.

19. The device according to claim 4, wherein the control unit comprises a data memory in which parameters for setting the tensile force for selected materials of the web are stored, the parameters being selected from torque, speed, material, film thickness, and temperature.

20. A device for inflating an inflatable sheet, the device comprising:

an inflation nozzle comprising a gas outlet configured to project gas, the inflation nozzle configured to temporarily capture an inflation channel of the inflatable sheet, wherein the inflation nozzle is an elongated cylindrical member;

a first pair of rollers, at least one of the first pair of rollers in mechanical communication with a first electric motor, at least one of the first pair of rollers comprising a heating element, wherein the heating element is configured to seal the inflation channel of the inflatable sheet after inflation of the inflatable sheet, wherein the at least one of the first pair of rollers comprising the heating element is composed of a heat resistant material;

a second pair of rollers, at least one of the second pair of rollers in mechanical communication with a second electric motor;

a cutting device disposed between the first pair of rollers and the second pair of rollers, the cutting device configured to slice the inflatable sheet such that the inflatable sheet is free from the inflation nozzle; and a control unit configured to actuate at least one of the first pair of rollers and at least one of the second pair of rollers, via the first electric motor and the second electric motor, respectively, wherein the control unit is configured to maintain a constant torque in the at least one of the second pair of rollers, wherein the constant toque is configured to maintain a desired tension in the inflatable sheet between the first pair of rollers and the second pair of rollers.

* * * * *